(12) United States Patent
Watson et al.

(10) Patent No.: US 8,862,603 B1
(45) Date of Patent: Oct. 14, 2014

(54) MINIMIZING STATE LISTS FOR NON-DETERMINISTIC FINITE STATE AUTOMATONS

(75) Inventors: Greg Watson, Palo Alto, CA (US); Kumaravel Senniappan, Bangalore (IN)

(73) Assignee: Netlogic Microsystems, Inc., Santa Clara, CA (US)

( * ) Notice: Subject to any disclaimer, the term of this patent is extended or adjusted under 35 U.S.C. 154(b) by 296 days.

(21) Appl. No.: 12/983,810

(22) Filed: Jan. 3, 2011

Related U.S. Application Data

(60) Provisional application No. 61/409,927, filed on Nov. 3, 2010.

(51) Int. Cl.
*G06F 17/30* (2006.01)

(52) U.S. Cl.
USPC .......................... 707/758; 707/712; 707/804

(58) Field of Classification Search
CPC ................................................. G06F 17/30864
USPC .......... 707/706, 712, 739, 804, 758, 999.006; 704/7; 715/261, 268; 711/1, 100, 103, 711/108
See application file for complete search history.

(56) References Cited

U.S. PATENT DOCUMENTS

| | | | |
|---|---|---|---|
| 4,575,818 A | 3/1986 | Almy et al. | |
| 5,299,206 A | 3/1994 | Beaverson et al. | |
| 5,712,971 A | 1/1998 | Stanfill et al. | |
| 6,473,846 B1 | 10/2002 | Melchior | |
| 6,654,373 B1 | 11/2003 | Maher et al. | |
| 6,731,526 B2 | 5/2004 | Inoue | |
| 6,760,821 B2 | 7/2004 | Stefan et al. | |
| 6,781,992 B1 | 8/2004 | Rana et al. | |
| 6,785,677 B1 | 8/2004 | Fritchman | |
| 6,856,981 B2 | 2/2005 | Wyschogrod et al. | |
| 6,892,237 B1 | 5/2005 | Gai et al. | |
| 6,952,694 B2 | 10/2005 | Mathur et al. | |
| 6,957,258 B2 | 10/2005 | Maher et al. | |
| 7,082,044 B2 | 7/2006 | Gould et al. | |
| 7,134,143 B2 | 11/2006 | Stellenberg et al. | |
| 7,225,188 B1 | 5/2007 | Gai et al. | |
| 7,240,040 B2 | 7/2007 | Wyschogrod et al. | |
| 7,254,632 B2 | 8/2007 | Zeira et al. | |
| 7,293,020 B2 | 11/2007 | Beylin | |
| 7,308,561 B2 | 12/2007 | Cornet et al. | |
| 7,339,942 B2 | 3/2008 | Morgan et al. | |
| 7,411,418 B2 | 8/2008 | Gould et al. | |
| 7,426,518 B2 | 9/2008 | Venkatachary et al. | 707/100 |
| 7,512,634 B2 * | 3/2009 | McMillen | 1/1 |
| 7,529,746 B2 | 5/2009 | Ichiriu et al. | |
| 7,539,031 B2 | 5/2009 | Ninan et al. | |

(Continued)

*Primary Examiner* — Greta Robinson
(74) *Attorney, Agent, or Firm* — Sterne, Kessler, Goldstein & Fox P.L.L.C.

(57) ABSTRACT

A method and apparatus are disclosed for determining whether an input string of characters matches a pattern. The pattern has the form of an activator expression, a counter expression, and a tail. The method involves monitoring one or more active states associated with the pattern, and comparing each character to the activator expression and the counter expression for each of the one or more active states. An input character match to the activator expression comprises an activator match, and a character match to the counter expression without matching the activator expression comprises a non-activator match. The number of one or more active states corresponds to the number of non-activator to activator character transitions between adjacent received matching characters.

24 Claims, 12 Drawing Sheets

(56) References Cited

U.S. PATENT DOCUMENTS

| | | |
|---|---|---|
| 7,539,032 B2 | 5/2009 | Ichiriu et al. ............... 365/49.1 |
| 7,624,105 B2 | 11/2009 | Ichiriu et al. |
| 7,624,436 B2 | 11/2009 | Balakrishnan et al. |
| 7,643,353 B1 | 1/2010 | Srinivasan et al. ......... 365/49.17 |
| 7,644,080 B2 | 1/2010 | Mammen et al. |
| 7,656,716 B1 | 2/2010 | Srinivasan et al. ......... 365/49.17 |
| 7,660,140 B1 | 2/2010 | Joshi et al. ................. 365/49.17 |
| 7,756,885 B2 | 7/2010 | Norton et al. |
| 7,784,094 B2 | 8/2010 | Balakrishnan et al. |
| 7,787,275 B1 | 8/2010 | Birman et al. ............... 365/49.1 |
| 7,821,844 B2 | 10/2010 | Srinivasan et al. ....... 365/189.02 |
| 7,826,242 B2 | 11/2010 | Joshi et al. ................. 365/49.17 |
| 7,831,606 B2 * | 11/2010 | Pandya ........................ 707/758 |
| 8,051,085 B1 * | 11/2011 | Srinivasan et al. ........... 707/737 |
| 2005/0114306 A1 | 5/2005 | Shu et al. |
| 2005/0273450 A1 * | 12/2005 | McMillen et al. ................ 707/1 |
| 2006/0085533 A1 | 4/2006 | Hussain et al. |
| 2007/0206602 A1 | 9/2007 | Halabi et al. |
| 2008/0109431 A1 * | 5/2008 | Kori ................................ 707/6 |

\* cited by examiner

MINIMIZING STATE LISTS FOR NON-DETERMINISTIC FINITE STATE AUTOMATONS

RELATED APPLICATION

This application claims benefit of priority under 35 USC 119(e) to U.S. Provisional Application No. 61/409,927 filed on Nov. 3, 2010, entitled "MINIMIZING STATE LISTS FOR NON-DETERMINISTIC FINITE STATE AUTOMATONS", the aforementioned application is hereby incorporated by reference in its entirety.

TECHNICAL FIELD

This disclosure relates generally to string searching and more specifically a method to reduce the number of tracked states in a non-deterministic finite state automaton for regular expression search operations.

BACKGROUND OF RELATED ART

Regular expression search operations are employed in various applications including, for example, intrusion detection systems (IDS), virus protections, policy-based routing functions, internet and text search operations, document comparisons, and so on. A regular expression can simply be a word, a phrase or a string of characters. For example, a regular expression including the string "gauss" would match data containing gauss, gaussian, degauss, etc. More complex regular expressions include metacharacters that provide certain rules for performing the match. Some common metacharacters are the wildcard ".", the alternation symbol "|", and the character class symbol "[ ]". Regular expressions can also include quantifiers such as "*" to match 0 or more times, "+" to match 1 or more times, "?" to match 0 or 1 times, {n} to match exactly n times, {n,} to match at least n times, and {n,m} to match at least n times but no more than m times. For example, the regular expression "a.{2}b" will match any input string that includes the character "a" followed exactly 2 instances of any character followed by the character "b" including, for example, the input strings "abbb," "adgb," "a7yb," "aaab," and so on.

Traditionally, regular expression searches have been performed using software programs executed by one or more processors, for example, associated with a network search engine. For example, one conventional search technique that can be used to search an input string of characters for multiple patterns is the Aho-Corasick (AC) algorithm. The AC algorithm locates all occurrences of a number of patterns in the input string by constructing a finite state machine that embodies the patterns. More specifically, the AC algorithm constructs the finite state machine in three pre-processing stages commonly referred to as the goto stage, the failure stage, and the next stage. In the goto stage, a deterministic finite state automaton (DFA) or search tree is constructed for a given set of patterns. The DFA constructed in the goto stage includes various states for an input string, and transitions between the states based on characters of the input string. Each transition between states in the DFA is based on a single character of the input string. The failure and next stages add additional transitions between the states of the DFA to ensure that a string of length n can be searched in exactly n cycles. More specifically, the failure and next transitions allow the state machine to transition from one branch of the tree to another branch that is the next best (i.e., the longest prefix) match in the DFA. Once the pre-processing stages have been performed, the DFA can then be used to search any target for all of the patterns in the pattern set.

One problem with prior string search engines utilizing the AC algorithm is that they are not well suited for performing wildcard or inexact pattern matching. As a result, some search engines complement the AC search technique with a non-deterministic finite automaton (NFA) engine that is better suited to search input strings for inexact patterns, particularly those that include quantifiers such as "k" to match 0 or more times, "+" to match 1 or more times, "?" to match 0 or 1 times, {n} to match exactly n times, {n,} to match at least n times, and {n,m} to match at least n times but no more than m times.

Employing an NFA engine to search an input string for a regular expression generally involves converting the regular expression into an NFA search tree that includes a number of states interconnected by goto or "success" transitions. Then, to search the input string for the regular expression, a state machine starts at an initial state of the NFA and transitions to one or more states of the NFA according to its goto transitions. If in a given state the input character matches the goto transition, the goto transition is taken to the next state in the string path and a cursor is incremented to point to the next character in the input string. Otherwise, if there is not a character match at a particular state, the state becomes inactive.

For example, FIG. 1 shows an NFA 100 that embodies the regular expression R1="[a-z][a-z0-9]{5}," which includes a prefix pattern P1 including the character class "[a-z]" followed by a quantified character class "[a-z0-9]{5}." An input string of characters will match the regular expression R1 if the input string includes a first character that matches the prefix character class [a-z] followed by n={5} characters that match the quantified character class [a-z0-9]. The NFA 100 for R1 includes an initial state or root node S0, intermediate states S1-S5, and a match state. The sequence of states S0-S5-Match are connected by goto transitions representing character matches with an input string, as indicated in FIG. 1. For example, if an input character within the prefix character class [a-z] is received while the state machine is in the initial state S0, the state machine transitions from S0 to S1 along the "[a-z]" goto transition, and the cursor is incremented to the next input character in the input string. Then, if the next input character is within the quantified character class [a-z0-9], the state machine transitions from S1 to S2 along the "[a-z0-9]" goto transition. Then, if the next input character is within the quantified character class [a-z0-9], the state machine transitions from S2 to S3 along the "[a-z0-9]" goto transition, and so on until a match is detected at the match state. Conversely, if at S1-S5 the input character is anything other than a character within the quantified character class [a-z0-9], then no transition occurs and the current state is deactivated. The initial state S0 remains active for the NFA, as indicated by the arrow 101, which matches on the wildcard ".". Thus, regardless of what the input character is, the root state S0 remains active.

The regular expression R1="[a-z][a-z0-9]{5}" is considered a complex regular expression because multiple states of the corresponding NFA 100 can be active at the same time. More specifically, because the quantified character class [a-z0-9] overlaps with (i.e., is a superset of) the prefix character class [a-z], each input character that matches the quantified character class also matches the prefix character class, and therefore not only causes the state machine to transition from one of states S1 to S5 to another of states S2-Match but also causes the state machine to activate an additional instance of state S1. The activation of the additional instance of S1 indicates the beginning of another separate and overlapping portion of the input string that can potentially match the regular expression R1. For example, Table 1 depicts a search operation between an input string IN1="abcdefgh" and the regular expression R1 according to the NFA 100 of FIG. 1.

TABLE 1

| Cycle | Input Character | Active States | Action |
|---|---|---|---|
| 1 | a | 0 | |
| 2 | b | 1,0 | |
| 3 | c | 2,1,0 | |
| 4 | d | 3,2,1,0 | |
| 5 | e | 4,3,2,1,0 | |
| 6 | f | 5,4,3,2,1,0 | match |
| 7 | g | 5,4,3,2,1,0 | match |
| 8 | h | 5,4,3,2,1,0 | match |

As shown in Table 1, the number of active states in the NFA 100 can quickly escalate because after the match between the first input character "a" and the prefix character class [a-z], each subsequent input character that matches both the prefix character class [a-z] and the quantified character class [a-z0-9] triggers another potentially matching sub-string and counts towards the quantified number {5} of matches of the character class [a-z0-9], which in turn can quickly exhaust counter resources within the NFA engine.

Unfortunately, the available memory to support an NFA engine is limited, and therefore the number of active states that can be maintained by the NFA engine is limited. As a result, information regarding active states may become lost due to unavailable state memory. Moreover, increasing the number of active states for each regular expression search operation may undesirably degrade search performance by overly taxing processing resources during each compare cycle.

Thus, a need exists for an NFA-based search system that minimizes the memory resources devoted to maintaining lists of active states and tracking numerous overlapping sub-string matches.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

In the following description, numerous specific details are set forth such as examples of specific components, circuits, and processes to provide a thorough understanding of the present embodiments. In the following description, for purposes of explanation, specific nomenclature is set forth to provide a thorough understanding of the present embodiments. However, it will be apparent to one skilled in the art that these specific details may not be required to practice present embodiments. In other instances, well-known circuits and devices are shown in block diagram form to avoid obscuring the present embodiments unnecessarily. It should be noted that the steps and operation discussed herein (e.g., the loading of registers) can be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be a single signal line, and each of the single signal lines may alternatively be buses. Further, the prefix symbol "/" or the suffix "B" attached to signal names indicates that the signal is an active low signal. Each of the active low signals may be changed to active high signals as generally known in the art.

A method and apparatus are disclosed for determining whether an input string of characters matches a pattern, such as a regular expression, using an NFA engine that is configured to use multiple counter values in state list entries to keep track of multiple active states corresponding to overlapping portions of the input string that can potentially match the regular expression. For some embodiments, each state entry includes a first counter value that indicates how many successive input characters match a quantified character class of the regular expression, and includes a second counter value that tracks the position of the first input character that can not result in a match with the regular expression. In other words, rather than create a separate state list entry each time another separate and potentially matching portion of the input string is detected, as common in conventional NFA engines, present embodiments utilize a second count value in the state list to track overlapping portions of the input string that can match the regular expression.

Figure 1:
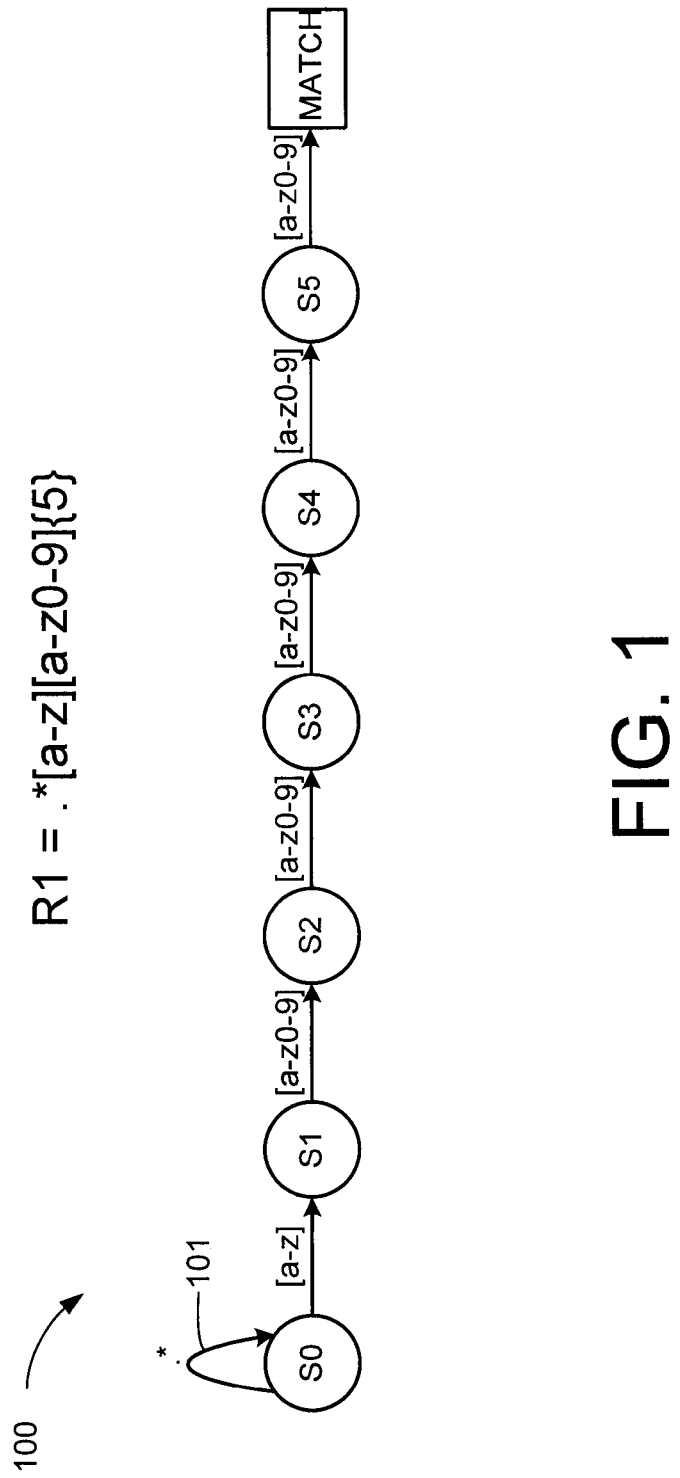
FIG. 1 depicts a non-deterministic finite automaton (NFA) representative of an exemplary regular expression R1=[a-z][a-z0-9]{5}.
Figure 2:
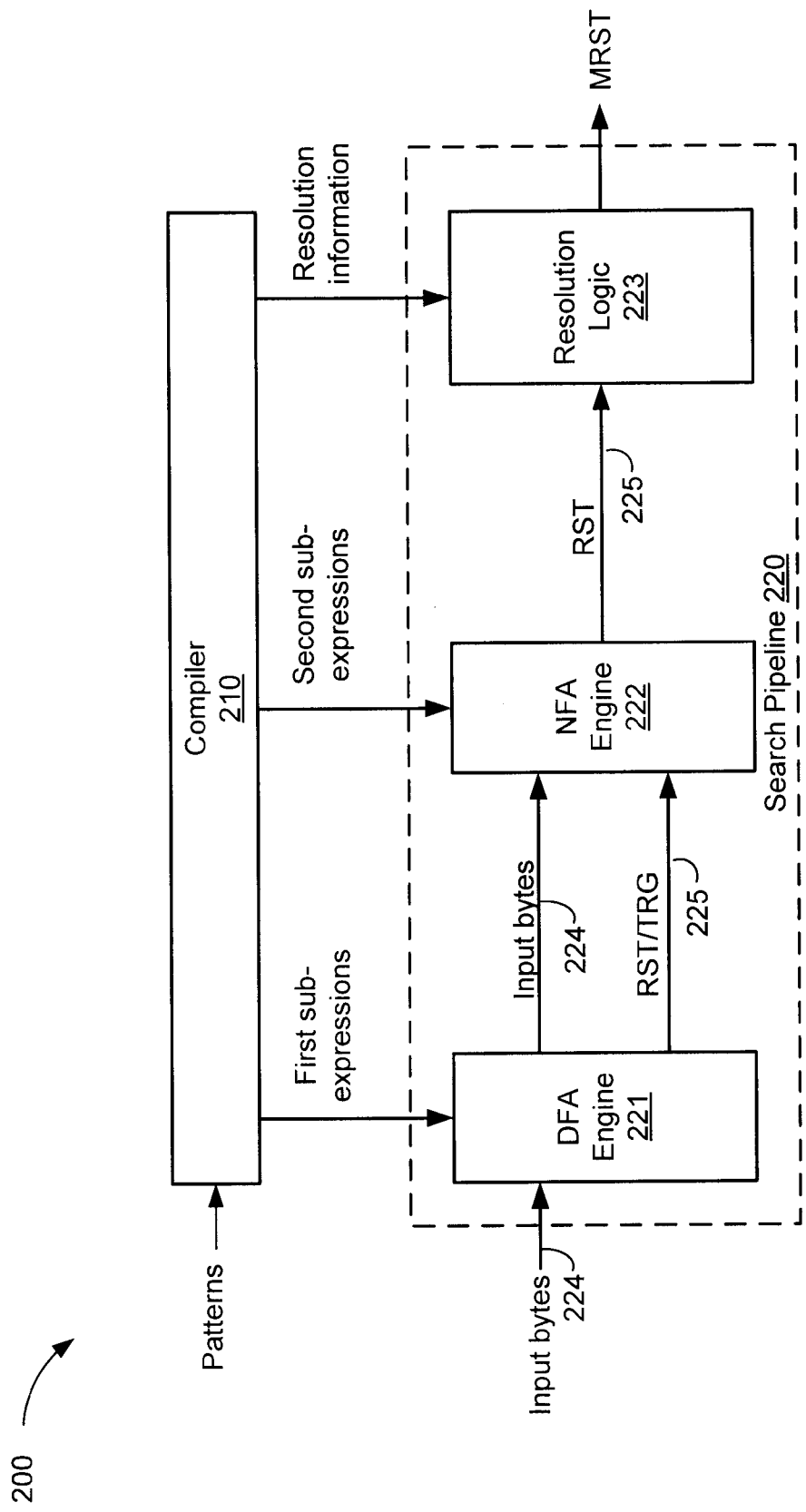
FIG. 2 is a block diagram of a content search system within which the present embodiments can be implemented.

FIG. 2 shows a content search system 200 in accordance with present embodiments. Search system 200 includes a compiler 210 and a search pipeline 220. The search pipeline includes a DFA engine 221, an NFA engine 222, resolution logic 223, a data pipeline 224, and a result pipeline 225. Compiler 210 includes an input to receive a number of regular expressions to be stored in search system 200, and includes outputs coupled to DFA engine 221, to NFA engine 222, and to resolution logic 223. Compiler 210, which can utilize any suitable compiling techniques, compiles (e.g., divides) each received regular expression into a number of sub-expressions and/or quantifiers. For some embodiments, the compiler divides selected regular expressions into sub-expressions that are separated by quantified wildcard operators such as ".*" and ".{n}". For example, compiler 210 can divide or segment the regular expression R3=ab.*cd.*ef into three different sub-expressions SE1-SE3, where SE1=ab, SE2=cd, and SE3=ef. After compiling the regular expression, the compiler 210 delegates each resulting sub-expression (and quantifiers, if applicable) to one of DFA engine 221 and to NFA engine 222, and provides information to search pipeline 220 on how to process the regular expression. Thus, for example, compiler 210 can provide to DFA engine 221 information identifying the sub-expressions for which DFA engine 221 is responsible, can provide to NFA engine 222 information identifying the sub-expressions for which NFA engine 222 is responsible, and provide to resolution logic 223 resolution information about how to process outputs received from DFA engine 221 and NFA engine 222. More specifically, the resolution information instructs the resolution logic 223 how to organize the output results (e.g., how to combine partial matches) generated by the DFA and NFA engines to generate an overall output match signal (MRST) indicating whether the input string matches one or more of the regular expressions.

For many regular expressions, the compiler 210 delegates exact patterns (e.g., strings) to the DFA engine 221, and delegates inexact patterns (e.g., sub-expressions including some quantified character classes) to the NFA engine 222. For example, for some exemplary embodiments, simple strings such as "ab" are delegated as first sub-expressions to the DFA engine, and sub-expressions having bounded quantified characters classes such as "z{5}" and "[d-f]{10}" are delegated as second sub-expressions to the NFA engine. For some regular expressions, the compiler 210 can delegate some exact patterns (e.g., patterns that are longer than a specified length) to the NFA engine 222.

DFA engine 221, which for some embodiments is optimized for performing exact match searches, includes an input to receive input characters or bytes from an input string, a control input to receive sub-expressions delegated to the DFA engine by the compiler 210, and includes an output to provide match results (RST) and/or a trigger signal (TRG) onto the result pipeline 225. As explained in more detail below, the match results (RST) generated by DFA engine 221 indicate matches between the input string and sub-expressions stored in the DFA engine 221, and the trigger signal TRG activates the NFA engine 222 to begin processing the input characters in the data pipeline 224.

NFA engine 222, which is capable of performing inexact match searches, includes a first input to receive the input bytes from the data pipeline 224, includes a second input to receive match results (RST), and/or the trigger signal (TRG) from DFA engine 221 via the result pipeline 225, includes a control input to receive sub-expressions delegated to the NFA engine by the compiler 210, and includes an output to provide match results (RST) onto the result pipeline 225. The match results (RST) generated by NFA engine 222 may indicate complete matches between the input string and rules or regular expressions stored entirely within the NFA engine or entirely within the DFA and NFA engines.

Figure 3:
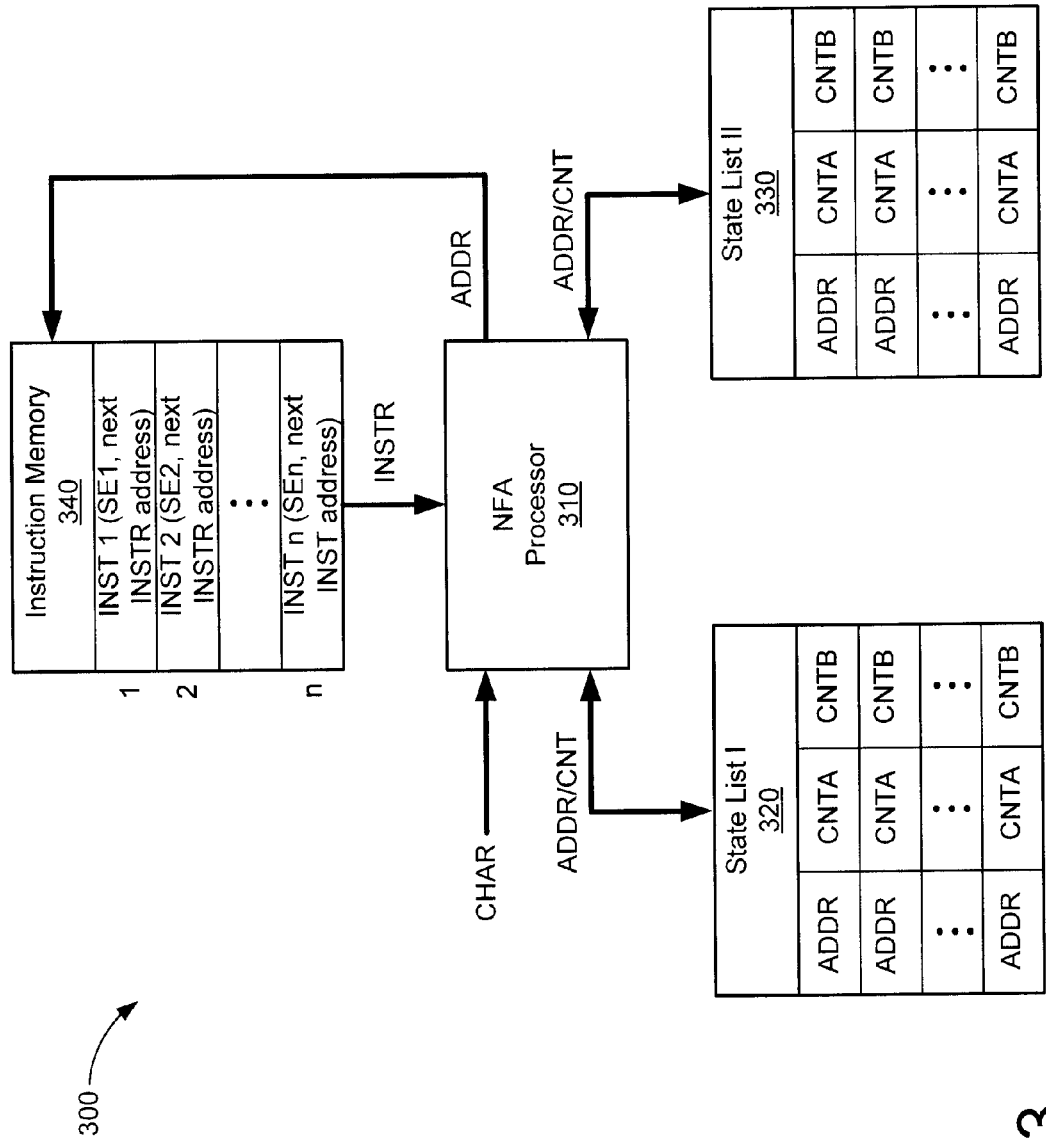
FIG. 3 is a block diagram showing one embodiment of the NFA engine in FIG. 2.

FIG. 3 shows an NFA engine 300 in accordance with some embodiments. NFA engine 300, which can be used as NFA engine 222 in search system 200, includes an NFA processor 310, first and second state lists 320 and 330, and an instruction memory 340. The NFA processor 310, which can be implemented in either software (e.g., using a CPU or multipurpose processor) and/or hardwired logic (e.g., using an ASIC or preconfigured logic gates), includes a data input to receive input characters (CHAR), a first control port coupled to State List I 320, a second control port coupled to State List II 330, a third control port coupled to the instruction memory 340, and a data port to receive instructions from instruction memory 340.

The instruction memory 340 stores a plurality of instructions that collectively embody one or more regular expressions to be searched for in the input string by the NFA processor 310. More specifically, the instructions are selectively provided by the instruction memory 340 to the NFA processor 310 in response to instruction address values ADDR provided thereto, and the NFA processor 310 executes the instructions to implement search operations between the input characters and the regular expression(s) embodied by the instructions. For some embodiments, regular expressions are stored in the instruction memory 340 as a number of separate rules or instructions that correspond to the activator sub-expression, counter sub-expression, and tail sub-expressions of the regular expression. For example, the regular expression R2=[ab][bc]{5}z can be classified to include an activator sub-expression "[ab]", a counter sub-expression "[bc]{5}", and a tail sub-expression "z", where the activator sub-expression "[ab]" specifies the characters that will activate the associated counter sub-expression "[bc]{5}", and the counter sub-expression specifies a number "{5}" of instances of the character class "[bc]" to be matched before activating the tail sub-expression "z". Thus, for an input string to match the regular expression R2, the input string must contain either an "a" or "b" followed by 5 instances of either "b" or "c" followed by a "z".

For the regular expression R2=[ab][bc]{5}z, the counter sub-expression overlaps the activator sub-expression because both contain the character "b". In accordance with the present embodiments, the character "b" is denoted as an "activator" character because it is contained in both the counter sub-expression and the activator sub-expression. Thus, after an input string matches the activator sub-expression "[ab]", each subsequent instance of the character "b" in the input string not only matches the counter sub-expression (and thus constitutes another of the 5 instances of the character class "[bc]" specified in the regular expression) but also matches the activator sub-expression (and thus constitutes the beginning of another separate and overlapping portion of the input string that can potentially match the regular expression). As a result, each subsequent instance of "b" in the input string not only simultaneously activates two states in the NFA (e.g. state S1 and one of S2-S5), but also requires a mechanism to track each separate overlapping matching portion of the input string.

In accordance with the present embodiments, the character "c" is denoted as a "non-activator" character because it is contained in the counter sub-expression but not in the activator sub-expression. Thus, after the input string matches the activator sub-expression "[ab]", each subsequent instance of the character "c" in the input string matches the counter sub-expression (and thus constitutes another of the 5 instances of the character class "[bc]" specified in the regular expression). Because the non-activator character does not match the activator sub-expression, the non-activator character does not trigger another instance of state S1 and does not constitute the beginning of a separate potentially matching portion of the input string. As a result, the position of the activator to non-activator character transition in the input string indicates when the counter states S2-S6 should terminate. More specifically, because the occurrence of the non-activator character in the input string does not trigger another instance of the counter sub-expression, the existing potentially matching portions of the input string must match the regular expression within n={5} subsequent characters, or the search operation results in a mismatch condition.

In accordance with present embodiments, rather than maintaining a separate state entry for each separate potentially matching portion of the input string (as implemented by conventional NFA engines), present embodiments use two separate counter values stored in the state lists 320 and 330 to track any number of separate and overlapping portions of the input string that can potentially match the regular expression. More specifically, each of state lists 320 and 330 includes a plurality of state entries, where each state entry includes an address field ADDR, a first count value CNTA, and a second count value CNTB. The address field ADDR stores an instruction address that identifies a corresponding instruction stored in the instruction memory 340 to be executed by the NFA processor 310. The first counter value CNTA indicates the number of sequential input characters that have matched the counter sub-expression, and the second counter value CNTB identifies the position of the first activator to non-activator character transition in the input string. Thus, during search operations between an input string and the regular expression embodied by the NFA, the first count value CNTA indicates the number of sequential input characters that match a quantified character class (e.g., the counter sub-expression), and the second count value CNTB identifies the position of the earliest instance of the matching input character that can not result in a match with the regular expression.

More specifically, for the first input character processed by the NFA processor 310, State List I 320 serves as the current state list and identifies which instructions are to be executed to perform the character compare operation at the current state of the NFA, and the results are stored as new state entries in State List II 330. Then, for the second input character, the state lists 320 and 330 are toggled, and State List II 330 serves as the current state list and identifies which instructions are to be executed to perform the character compare operation, and the results of the second character compare operation are then stored as the next state entries in State List I 320.

Figure 4:
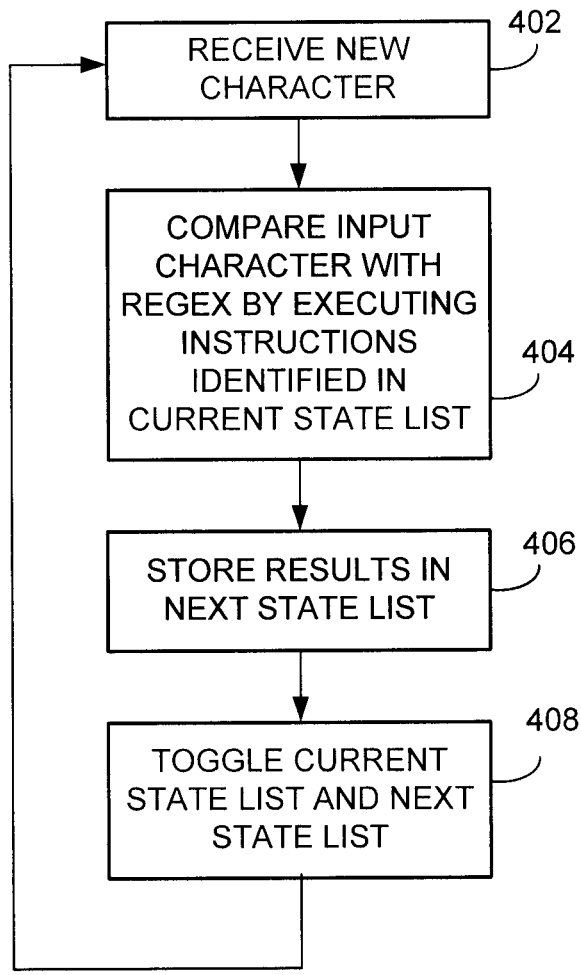
FIG. 4 is a flow chart depicting an exemplary operation of toggling the state lists of the NFA engine of FIG. 3.

A general operation of the toggling of the two state lists 320 and 330 during regular expression search operations of the NFA engine 300 is described below with respect to the illustrative flow chart of FIG. 4. First, the NFA engine 300 receives an input character (402), and then compares the input character with the regular expression by executing instructions identified in the current state list, which is initially served by State List I 320 (404). As mentioned above, the current state list includes a number of state entries, each of which includes an address value that identifies a corresponding instruction to be executed by the NFA processor 310. More specifically, the NFA processor 310 sequentially executes the instructions identified by the address values stored in successive valid state entries of the current state list to compare the input character with the NFA goto transitions (e.g., character edges) at the current state of the NFA graph. The results of the compare operation are then stored as new state entries in the next state list, which is initially served by State List II 330 (406). The new state entries stored in the next state list identify which instructions are to be executed by the NFA processor 310 for the next state of the NFA graph. Then, the current state list and the next state list are toggled prior to the next compare operation so that State List II 330 is designated as the current state list and State List I 320 is designated as the next state list (408), and the next input character is received for processing.

Figure 5:
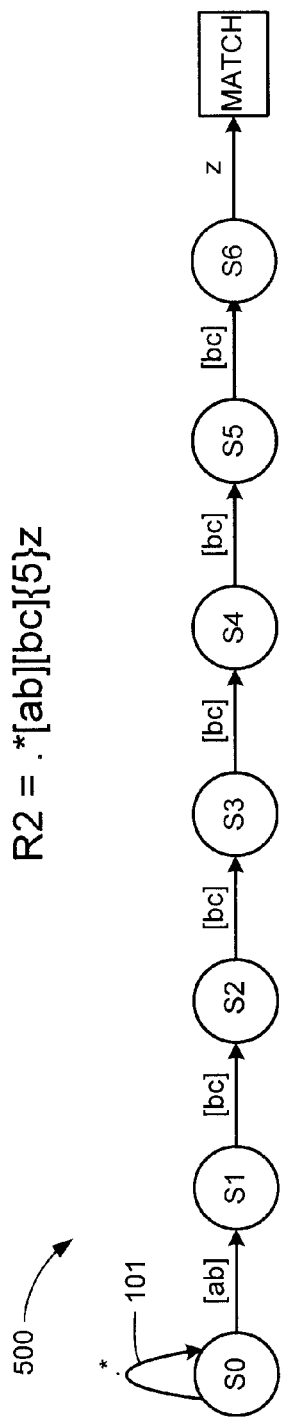
FIG. 5A depicts an NFA representative of an exemplary regular expression R2=.*[ab][bc]{5}z.
FIG. 5B depicts an exemplary instruction set for implementing the NFA of FIG. 5A in accordance with some embodiments.
Figure 6:
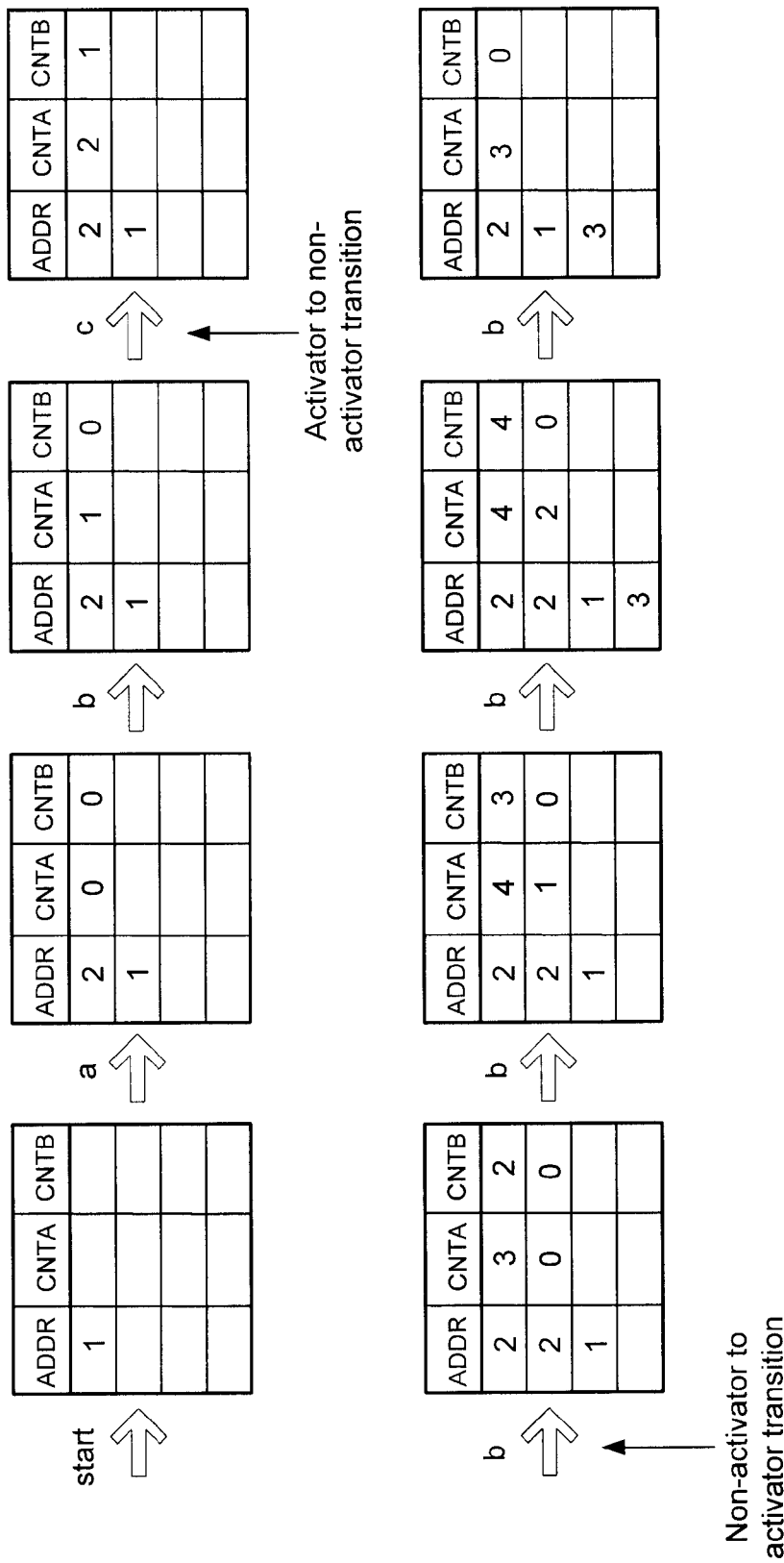
FIG. 6 depicts exemplary state list entries for the NFA engine of FIG. 3 when searching an input string for the regular expression R2=[ab][bc]{5}z in accordance with some embodiments.
Figure 7:
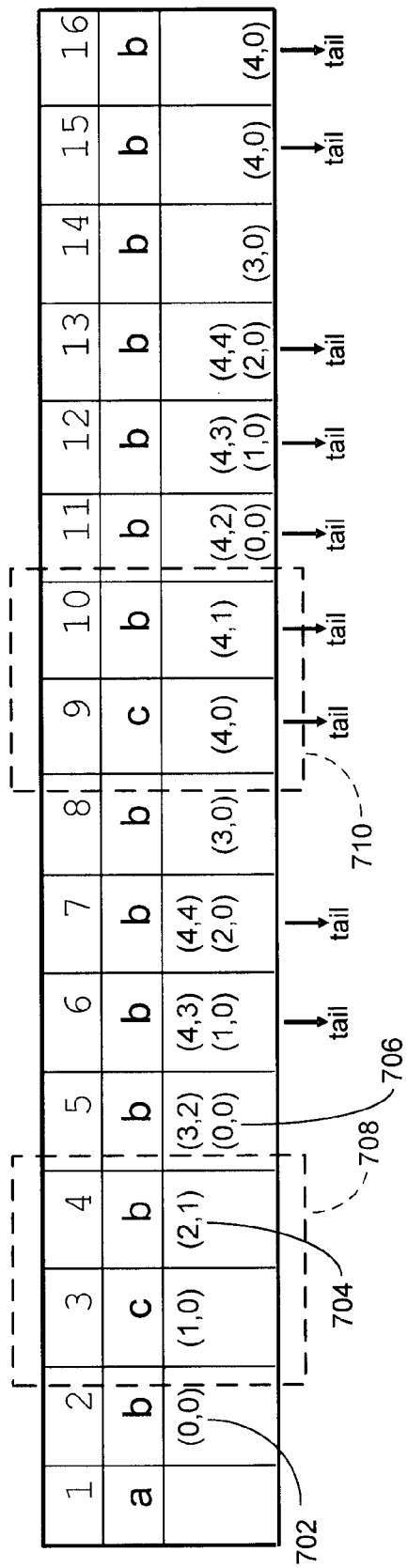
FIG. 7 shows a table summarizing the first and second count values associated with the state entries of the NFA engine of FIG. 3 when searching an input string for the regular expression R2=[ab][bc]{5}z in accordance with some embodiments.

An exemplary search operation performed by the NFA engine 300 of FIG. 3 is described below with respect to FIGS. 5A, 5B, 6, and 7, where FIG. 5A shows an NFA graph 500 embodying the regular expression R2=.*[ab][bc]{5}z, FIG. 5B depicts the instruction memory 340 of FIG. 3 storing four instructions that collectively represent the regular expression R2=.*[ab][bc]{5}z, FIG. 6 shows sequential state list entries for a progression of input characters from the input string IN2="bbcbbbbbcbbbbbbb", and FIG. 7 summarizes the two count values for the progression of input characters of IN2. For FIG. 6, each state list shows the address values identifying each instruction to be executed for the current NFA state, as well as the first and second count values associated with each state entry. For the chart of FIG. 7, the top row shows the position of each character within the input string, the second row shows the corresponding input character, and the third row shows the first and second count values (CNTA, CNTB) prior to processing of the corresponding input character.

Referring to FIG. 5B, the first instruction (INST1) is stored at ADDR=1 and includes an activator expression "[ab]," includes a first next instruction value of ADDR=2 that identifies a next instruction to be executed if there is a match with the activator edge "[ab]", and includes a second next instruction value of ADDR=1 that maintains the first instruction in an active state (e.g., so that the NFA is always looking for the activator expression [ab] that, upon a match, triggers the counter sub-expression. The second instruction (INST2) is stored at ADDR=2 and includes a counter expression "[bc]{5}," includes a first next instruction value of ADDR=2, and includes a second next instruction value of ADDR=3. The first instruction value of ADDR=2 identifies the next instruction to be executed if there is a match with the counter edge [bc] and there have been less than n={5} sequential input character matches with [bc], and the second instruction value of ADDR=3 identifies the next instruction to be executed if there is a match with the counter edge [bc] and there have been n={5} sequential input character matches with [bc]. The third instruction (INST3) is stored at ADDR=3 and includes a tail "z" and includes a next instruction value of ADDR=4 that identifies a next instruction to be executed if there is a match with the tail edge "z". The fourth instruction (INST4) is stored at ADDR=4 and includes an opcode "match."

Referring now to FIG. 6, the current state list (hereinafter denoted as "CSL") is initially loaded with a state entry SE1 having an address value ADDR=1 that identifies the first instruction [ab]⇒2,1 stored in the instruction memory 340. The count values for SE1 are left empty (e.g., set to invalid states) because there is no quantifier associated with the activator sub-expression [ab]. Then, the first input character "a" is received and compared with R2 by NFA processor 310 fetching and executing INST1. Because the input character "a" matches the activator sub-expression [ab], NFA processor 310 writes the state entry SE2 in the next state list (hereinafter referred to as "NSL") having an address value of ADDR=2, as indicated by the next instruction address value ADDR=2 contained in INST1. The creation of the SE2 in the NSL triggers the counter sub-expression [bc]{5}. The first and second count values of the new state entry SE2 are both initialized to 0 to reflect that there have not yet been any matches with the counter sub-expression. Note that for the exemplary regular expression R2, which includes a leading .* metacharacter, the NFA processor 310 always writes the first state entry SE1 as a separate state entry in the NSL so that the NFA processor 310 is always enabled to detect another occurrence of an input character that matches the activator sub-expression [ab]. FIG. 7 illustrates the count values CNTA=0 and CNTB=0 of SE2 in the NSL as (0,0) in column 2, at 702.

The CSL and NSL are toggled, and the second input character "b" is received and compared with R2 by NFA processor 310 fetching and sequentially executing the instructions identified by the state entries in the CSL. Thus, NFA processor 310 first executes INST2 to compare "b" with the counter sub-expression and then executes INST1 to compare "b" with the activator sub-expression. The second input character ""b" matches both the activator sub-expression [ab] and the counter sub-expression [bc], and is therefore classified as an activator character.

More specifically, because the input character "b" matches the counter sub-expression [bc] and there have been less than n={5} sequential counter sub-expression matches, NFA processor 310 writes the state entry SE2 in the NSL having an address value of ADDR=2, as indicated by the second next instruction address value ADDR=2 contained in INST2. The first count value of the new state entry SE2 is incremented to CNTA=1 to indicate that there has been 1 character match with the counter sub-expression, and the second count value of the new state entry SE2 is maintained at CNTB=0 because there have been 0 input characters since the first non-activator input character. FIG. 7 illustrates the count values CNTA=1 and CNTB=0 of SE2 in the NSL as (1,0) in column 3.

Note that although the second input character "b" also matches the activator sub-expression [ab] and therefore constitutes the beginning of a separate overlapping portion of the input string that can potentially match the regular expression R2, the NFA processor 310 does not create and maintain a corresponding separate state entry in the NSL, as is common in conventional NFA search operations. Instead, the additional count value CNTB in the state entry SE2 is used to track multiple overlapping portions of the input string that can potentially match the regular expression R2. In this manner, consumption of the limited state list resources is minimized when regular expression search operations involve multiple separate overlapping portions of the input string that can potentially match the regular expression.

The CSL and NSL are toggled, and the third input character "c" is received and compared with R2 by NFA processor 310 fetching and sequentially executing the instructions identified by the state entries in the CSL. Thus, NFA processor 310 first executes INST2 to compare "c" with the counter sub-expression and then executes INST1 to compare "c" with the activator sub-expression. The third input character matches the counter sub-expression [bc] but not the activator sub-expression [ab], and is therefore classified as a non-activator character.

More specifically, because the input character "c" matches the counter sub-expression [bc] and there have been less than n={5} sequential counter sub-expression matches, NFA processor 310 writes the state entry SE2 in the NSL having an address value of ADDR=2, as indicated by the second next instruction address value ADDR=2 contained in INST2. The first count value of the new state entry SE2 is incremented to CNTA=2 to indicate that there have been 2 character matches with the counter sub-expression. The second count value of the new state entry SE2 is incremented to CNTB=1 in response to the activator to non-activator character transition in the input string, thereby indicating the position of the first non-activator character in the input string. Thus, for the next input character, the CNTB=1 in the state list indicates that there has been 1 input character since the first non-activator input character. FIG. 7 illustrates the count values CNTA=2 and CNTB=1 of SE2 in the NSL as (2,1) in column 4, at 704.

The CSL and NSL are toggled, and the fourth input character "b" is received and compared with R2 by NFA processor 310 fetching and sequentially executing the instructions identified by the state entries in the CSL. Thus, NFA processor 310 first executes INST2 to compare "b" with the counter sub-expression and then executes INST1 to compare "b" with the activator sub-expression. The fourth input character "b" matches both the activator sub-expression [ab] and the counter sub-expression [bc], and is therefore classified as an activator character.

More specifically, because the input character "b" matches the counter sub-expression [bc] and there have been less than n={5} sequential counter sub-expression matches, NFA processor 310 writes the state entry SE2 in the NSL having an address value of ADDR=2, as indicated by the second next instruction address value ADDR=2 contained in INST2. The first count value of the new state entry SE2 is incremented to CNTA=3 to indicate that there have been 3 character matches with the counter sub-expression, and the second count value of the new state entry SE2 is incremented to CNTB=2 because there have been 2 input characters since the first non-activator input character. FIG. 7 illustrates the count values CNTA=3 and CNTB=2 of SE2 in the NSL as (3,2) in column 5.

Further, in response to the non-activator to activator character transition in the input string, NFA processor 310 creates a new state entry in the NSL, at 706 in FIG. 7, with the first and second count values both initialized to 0 (0,0). The corresponding new state entry in the NSL is shown in FIG. 6 as a second state entry having the address field of ADDR=2, CNTA=0, and CNTB=0.

Similar operations occur for the fifth input character "b", and thus NFA processor 310 writes the two state entries SE2 into the NSL. Because the fifth input character "b" is an activator character, the NFA processor 310 increments both count values CNTA and CNTB of the first instance of SE2 in the NSL to CNTA=4 and CNTB=3. Thus, CNTA is incremented because "b" constitutes another match with the counter sub-expression, and CNTB is incremented because another input character has passed since the first non-activator character (the $3^{rd}$ input character, "c"). For the second instance of the state entry SE2, the NFA processor 310 increments the first count value to CNTA=1 because "b" constitutes another match with the counter sub-expression, but maintains the second count value at CNTB=0 because a non-activator character has not been processed since the triggering of the second state entry for SE2.

The sixth input character is a "b", and thus NFA processor 310 writes the two state entries SE2 into the NSL. Because the input character "b" is an activator character, the NFA processor 310 should increment both count values CNTA and CNTB of the first instance of SE2. However, because the first count value CNTA was previously equal to n−1 (i.e., CNTA=4={5}−1), the $6^{th}$ input character "b" represents the n=$5^{th}$ sequential character match with the counter sub-expression [bc], and therefore triggers the tail sub-expression "z". Thus, in accordance with the present embodiments, the NFA processor 310 maintains CNTA=4, increments CNTB to 4, and creates a new state entry in the NSL having an address field ADDR=3 identifying the instruction associated with the tail sub-expression, as shown in FIG. 6. The state entry SE3, which represents the triggering of the tail sub-expression "z", does not include first and second count values because there is not a quantifier value associated with the tail sub-expression "z". The activation of the tail sub-expression is also depicted in FIG. 7 by the "arrow to tail" in column 6.

In addition, for the second instance of the state entry SE2, the NFA processor 310 increments the first count value to CNTA=2 because "b" constitutes another match with the counter sub-expression, but maintains the second count value at CNTB=0 because a non-activator character has not been processed since the triggering of the second state entry for SE2.

The seventh input character is a "b", which is another activator character, and also activates the tail sub-expression because CNTA=4 and thus the match on the $7^{th}$ input character represents another sequence of 5 input characters that match the counter sub-expression. Because CNTB is equal to CNTA, CNTB has reached its maximum value (e.g., CNTA=CNTB=n−1), and thus the corresponding state entry terminates. Accordingly, the NFA processor 310 does not write the first instance of the state entry SE2 into the NSL, but does write the second instance of SE2 with the first count value incremented to CNTA=3 and the second count value maintained at CNTB=0. More specifically, the first instance of the state entry SE2 is terminated when CNTB=CNTA=n−1 because the most recent non-activator input character was 4 characters ago (i.e., the $3^{rd}$ input character "c"), and therefore the next input character (i.e., the $8^{th}$ input character) cannot trigger the tail sub-expression because the $3^{rd}$ input character "c" does not match the activator sub-expression. Note that for search operations performed by exemplary embodiments of the NFA engine 300, the maximum value of the first count value CNTA is set at n−1 because the first and second count values CNTA and CNTB are compared with each other (to selectively terminate state entries) prior to incrementing the count values, which conserves resources of the state list by terminating a state entry (e.g., when CNTA=CNTB=n−1) before it is actually written into the NSL. For other embodiments, the maximum value of CNTA could be set to n (rather than n−1), and then the corresponding state entry would be terminated from the state list when CNTA=CNTB=n; for such other embodiments, the state entry would be terminated one compare cycle later than in the exemplary embodiment described above with respect to FIGS. 5A-5B, 6, and 7.

Similar operations continue for the remaining input characters, with new state entries created only when there is a non-activator to activator character transition, as shown in phantom at 708 and 710 in FIG. 7. Table 2 summarizes the counter operations for the comparison between the input string IN2 and the regular expression R2.

| Cycle | Input Character | Active NFA States | # state list entries for counter exp in search engine 300 | # state list entries for counter exp for prior search engine |
|---|---|---|---|---|
| 1 | a | 1 | 0 | 0 |
| 2 | b | 1 | 1 | 1 |
| 3 | c | 1 | 1 | 2 |
| 4 | b | 1 | 1 | 3 |
| 5 | b | 1, 2 | 2 | 4 |
| 6 | b | 1, 2 | 2 | 5 |
| 7 | b | 1, 2 | 2 | 5 |
| 8 | b | 1, 2 | 1 | 5 |
| 9 | c | 1, 2 | 1 | 5 |
| 10 | b | 1, 2 | 1 | 5 |
| 11 | b | 1, 2, 3 | 2 | 5 |
| 12 | b | 1, 2, 3 | 2 | 5 |
| 13 | b | 1, 2, 3 | 2 | 5 |
| 14 | b | 1, 3 | 1 | 5 |
| 15 | b | 1, 3 | 1 | 5 |
| 16 | b | 1, 3 | 1 | 5 |

As shown in Table 2, the active state operations described in detail above significantly reduce the number of state entries in the current state list, as compared to conventional NFA search engines.

Figure 8A:
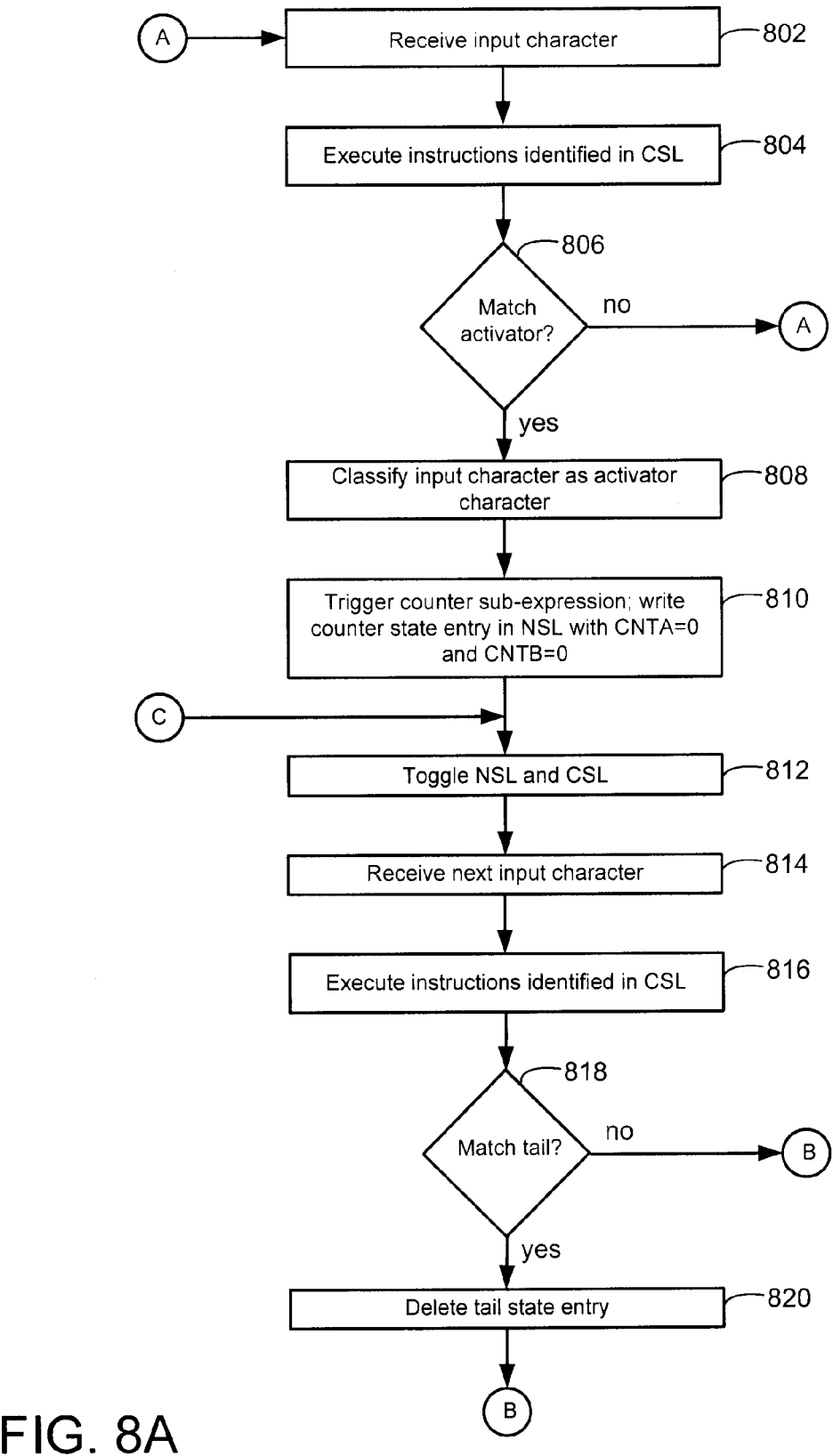
FIGS. 8A-8B are a flow chart depicting an exemplary search operation of the NFA engine of FIG. 3 in accordance with some embodiments.
Figure 8B:
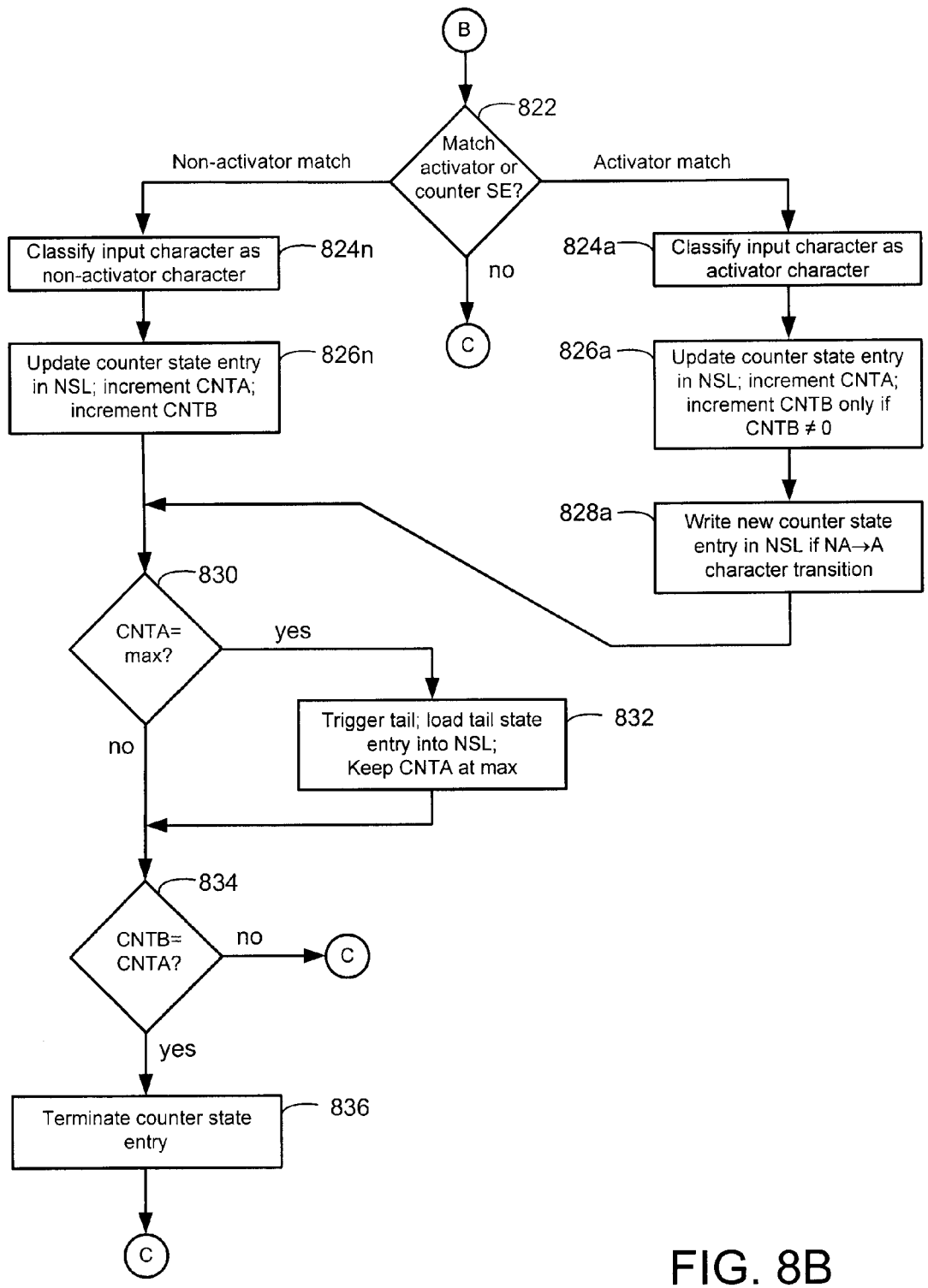

FIGS. 8A-8B are a flow chart summarizing regular expression search operations performed by the NFA engine of FIG. 3 from a logical perspective in which the maximum value of the first count value CNTA is set to n (rather than n−1). First, a state entry identifying the location in the instruction memory 340 of instructions associated with the root node of the NFA are loaded in the CSL, and the first input character is received (802). For the exemplary regular expression R2 discussed above, a state entry identifying instructions associated with the activator sub-expression "[ab]" are initially loaded into the CSL. Then, the NFA processor 310 executes the instructions identified in the CSL (804). If the input character does not match the activator sub-expression, as tested at 806, the state lists are toggled and processing continues at 802.

If the input character matches the activator sub-expression, as tested at 806, the input character is classified as an activator character (808). This triggers the counter sub-expression, and the NFA processor 310 writes the counter sub-expression state entry into the NSL with both CNTA and CNTB initialized to zero (810). The state lists are toggled so that the NSL becomes the CSL and vice versa (812), the next input character is received (814), and the NFA processor 310 executes the instructions identified in the CSL (816). If the input character matches the tail sub-expression (which isn't activated until n sequential input characters match the counter sub-expression, as tested at 818, the tail state entry is deleted (820). Otherwise, processing continues at 822, which determines whether the input character matches the activator sub-expression and/or the counter sub-expression. If the input character does not match the activator sub-expression or the counter sub-expression, processing continues at 812.

If the input character matches the activator sub-expression and the counter sub-expression, the input character is classified as a non-activator character (824n), and the NFA processor 310 updates the counter state entry by writing the counter state entry into the NSL, and incrementing both the first and second count values CNTA and CNTB (826n). Thus, when there has been an activator to non-activator input character transition, the second count value CNTB is incremented to indicate that the successive triggering of the counter sub-expression has been interrupted, and subsequently the second count value CNTB can be used to identify the position of the first non-activator input character. Thus, in accordance with present embodiments, the addition of the second count value in the state can be used to indicate that a match with the regular expression cannot occur CNTB input character later.

If the input character matches the activator sub-expression but not the counter sub-expression, as tested at 822, the input character is classified as an activator character (824a), and the NFA processor 310 updates the counter state entry by writing the counter state entry into the NSL, incrementing the first count value CNTA, and incrementing the second count value CNTB only if CNTB≠0 (826a). Thus, if the previous input character was a non-activator character, then there has been a non-activator to activator input character transition (NA⇒A), and the NFA processor 310 writes a new counter state entry in the NSL having both count values CNTA and CNTB initialized to zero (828a). The new counter state entry in the NSL indicates a new triggering of the counter sub-expression that is not being tracked by the previous counter state entry because of the intervening non-activator character.

Then, the NFA processor 310 determines whether the first count value CNTA exceeds the maximum value (830). If CNTA=n (which as described above is the maximum count value), as tested at 830, then the NFA processor 310 triggers the tail sub-expression and writes the tail sub-expression into the NSL (832). The NFA processor 310 also keeps the first count value CNTA at the maximum value to indicate that any subsequent character match with the counter sub-expression will again trigger the tail sub-expression. Otherwise, processing continues at 834.

Then, the NFA processor 310 compares the first and second values CNTA and CNTB with each other (834). If CNTA=CNTB=n, then the NFA processor 310 terminates the associated counter state entry, for example, by not writing the counter state entry into the NSL (836). More specifically, when CNTA=CNTB=n, the first non-activator input character was n characters ago, and therefore the next input character cannot produce a match with the regular expression because the input character that matched the activator sub-expression was n characters ago, which is the number of sequential input characters needed to match the counter sub-expression.

As explained earlier in relation to the overall content search system 200, the compiler 210 plays an important role in managing search operations. In one embodiment, the compiler configures the NFA engine 222 to process match conditions for activator input characters separately from non-activator input characters. This provides a straightforward way to carry out the counter operations described above.

In a further embodiment, backwards compatibility for conventional compilers may be realized by compensating for errors that may be incurred by conventional compilers that follow the state suppression methods described herein. The compensation thus enables a conventional compiler to process activator matches together with non-activator matches, while suppressing the number of active state entries in the state list associated with the respective matches. Without such compensation provided within NFA engines of the present embodiments, additional and/or more complicated instructions may be needed to differentiate between activator matches and non-activator matches.

Figure 9:
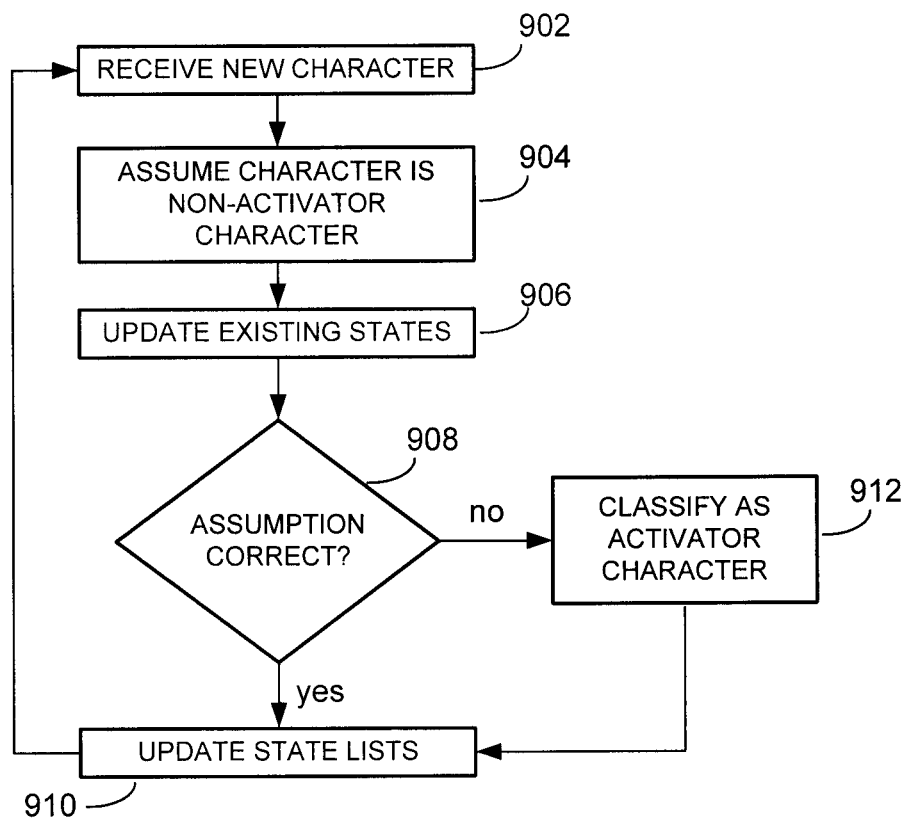
FIG. 9 is a flow chart outlining count value corrections during search operations performed by the NFA engine of FIG. 3 in accordance with some embodiments.

FIG. 9 is a flow chart depicting an illustrative operation for compensating for the use of conventional techniques in handling the counter operations described in detail above. Input characters or bytes are each received (902), and assumed to be non-activator characters (904). For existing active states in the current state list, the first counter value CNTA is incremented to track the number of sequential input characters that match the counter sub-expression, and the second counter value CNTB is incremented to track the position of the first non-activator character, and the resulting updated state entry is placed in the NSL (906). A determination as to whether the input character assumption was correct is then made (908).

For some embodiments, this determination is performed by examining the contents of the NSL to see if a new state entry for the counter sub-expression has just been created in the NSL (with both counter values set to zero). If not, then the current character was correctly assumed to be a non-activator character. If there was a new state entry created in the NSL, then the assumption was incorrect, and the input character should be classified as an activator character (recall that new state entries for the counter sub-expression are created in response to non-activator to activator character transitions in the input string, and thus if a new state entry is created in the NSL, then the input character is an activator character).

If the non-activator character assumption was correct, as tested at 908, then the state lists are toggled and the NSL becomes the CSL for the next character compare operation (910), and the process iterates back to receiving a new input character (902).

Conversely, if the input character classification assumption was incorrect, as tested at 908, and the received input character was in fact an activator character, then the new state entry in the NSL is modified to correctly classify the input character as an activator (912). Generally speaking, detecting and correcting errors in the state list due to an incorrect input character classification assumption works well in most instances. However, in the case where the assumption is wrong (assuming that the input character is an activator), and the second count value CNTB is at "0" (no non-activator byte has in fact been received), certain specific corrections need to be employed.

Figure 10A:
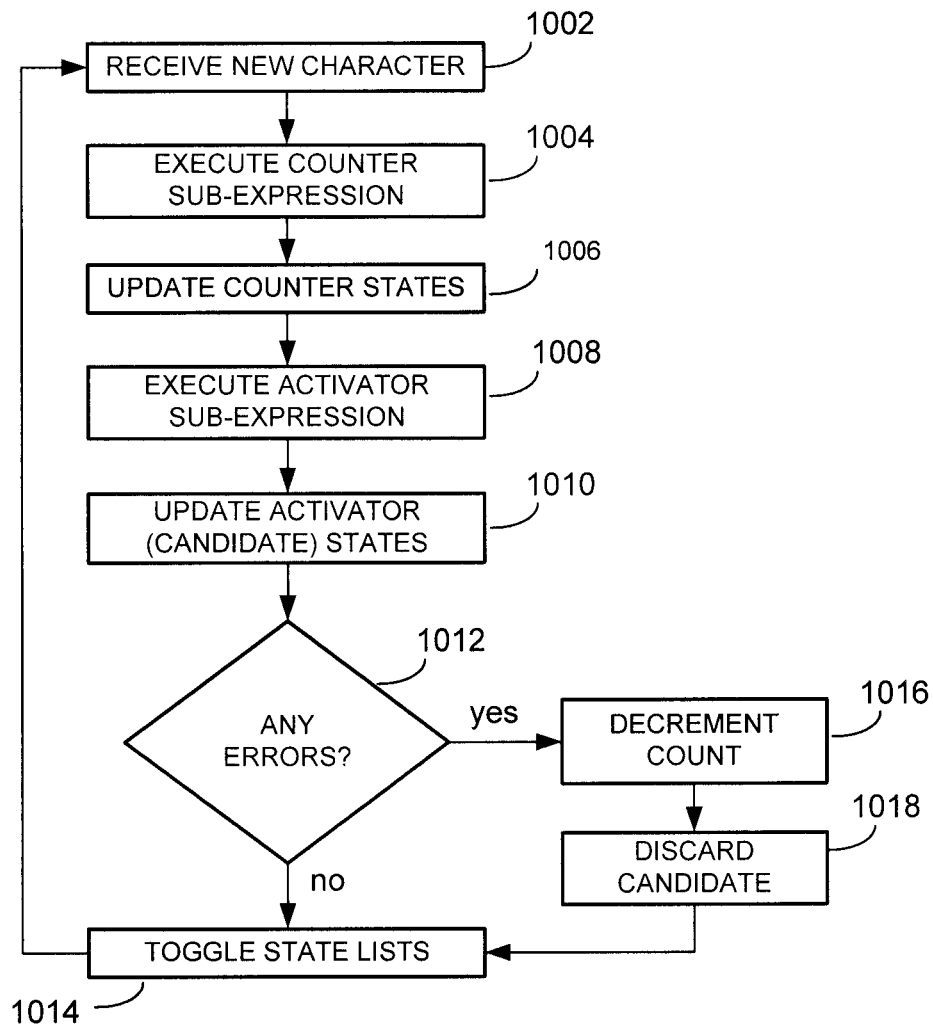
FIG. 10A is a flow chart depicting count value corrections when a counter sub-expression instruction is executed before an activator sub-expression instruction.

Generally, the manner of correcting the state list to compensate for the case where the second count value CNTB is "0", and the input character is an activator character depends on the order that sub-expressions are executed by the NFA engine. FIG. 10A illustrates the case in which counter sub-expressions are executed before activator sub-expressions. At 1002, the NFA engine receives a new input character for evaluation against one or more active states in the CSL. A counter sub-expression executes first, at 1004, followed by an updating of the active counter states, at 1006. The activator sub-expression then executes, at 1008, and the corresponding activator state(s) are updated. With conventional NFA techniques, each input character that matches the activator sub-expression triggers the creation of a new state entry (or "candidate" state entry) in the CSL. A determination is then made, at 1012, as to whether any errors were made with the original non-activator input character assumption. If no error exists, then the NSL and CSL are toggled, at 1014, for the next incoming input character. If an error does exist, then the modified count from step 1006 is decremented only if CNTB=1 (i.e., only if CNTB was just incremented from 0⇒1), at 1016, to compensate for the inaccurate count, and the candidate state is discarded or suppressed, at 1018.

Figure 10B:
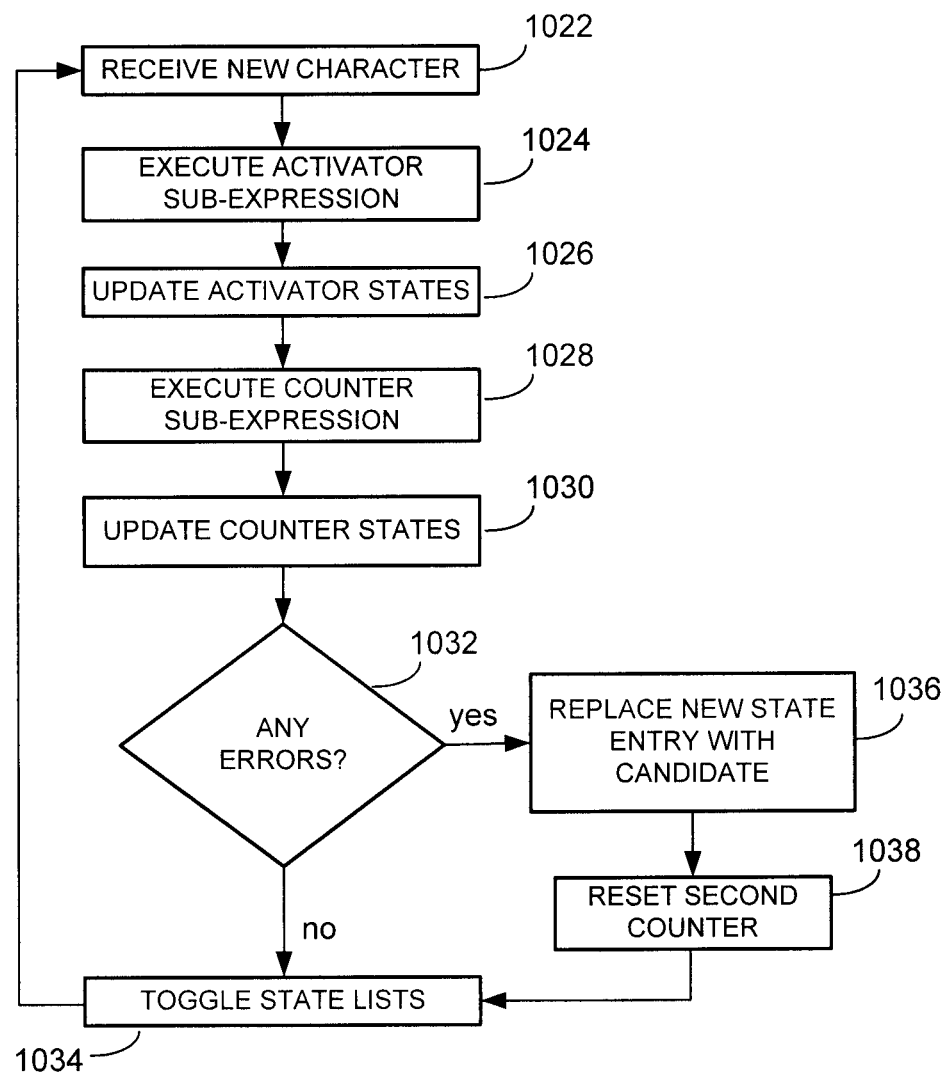
FIG. 10B is a flow chart depicting count value corrections when an activator sub-expression instruction is executed before a counter sub-expression instruction.

FIG. 10B illustrates the case in which activator sub-expressions are executed before counter sub-expressions. First, a new input character is received, and a walk through of the CSL initiated in which instructions identified by successive state entries are sequentially executed by the NFA engine (1022). Activator sub-expressions are first executed (1024), followed by an update of the activator state entries (1026). Counter sub-expressions are then executed (1028), with corresponding updates to the counter state entries (1030). A determination is then made, at 1032, as to whether the original input character classification assumption was correct. If so, the NSL is updated (1034), and a new input character is processed (1022). If the assumption of a non-activator character is incorrect and if CNTB=1 (i.e., if CNTB was just incremented from 1), as tested at 1032, the new activator candidate state entry replaces the new activator state entry (1036), and the second counter value CNTB is reset to zero (1038).

In the foregoing specification, present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A content search system configured to determine whether a string of input characters matches a regular expression that includes an activator sub-expression and a counter sub-expression, wherein the activator sub-expression comprises a prefix string and the counter sub-expression comprises a quantified character class, the content search system comprising:
   an instruction memory for storing a number of instructions, each embodying one of the sub-expressions;
   a hardware-implemented processor having an input to receive the string of input characters and configured to sequentially process the input characters by executing instructions selectively retrieved from the instruction memory,
   wherein each input character that matches both the counter sub-expression and the activator sub-expression is classified as an activator character, and each input character that matches the counter sub-expression but not the activator sub-expression is classified as a non-activator character; and
   a state list for storing a number of state entries that identify which of the instructions stored in the instruction memory are to be executed by the processor to process a current input character,
   wherein each state entry corresponding to the counter sub-expression includes an address value that identifies a corresponding instruction stored in the instruction memory, a first count value that indicates how many sequential input characters match the counter sub-expression, and a second count value that identifies a position of a first activator to non-activator character transition in the input string.

2. The content search system of claim 1, wherein the position of the first activator to non-activator character transition indicates an earliest input character that cannot result in a match with the regular expression.

3. The content search system of claim 1, wherein the number of state entries in the state list is determined by a number of non-activator to activator character transitions in the string of input characters.

4. The content search system of claim 1, wherein the hardware-implemented processor implements a non-deterministic finite automaton (NFA) that embodies the regular expression.

5. The content search system of claim 1, wherein the state list comprises:
   a current state list to store state entries that identify which of the instructions stored in the instruction memory are to be executed to process the current input character; and
   a next state list to store state entries that identify which of the instructions stored in the instruction memory are to be executed to process a next input character.

6. The content search system of claim 5, wherein the current state list and the next state list are toggled prior to processing the next input character.

7. The content search system of claim 1, wherein the first count value is incremented in response to input character matches with the counter sub-expression, and the second count value is initially incremented in response to the first activator to non-activator character transition.

8. The content search system of claim 7, wherein the second count value is subsequently incremented in response to input character matches with the counter sub-expression.

9. The content search system of claim 8, wherein the quantified character class comprises a predetermined number of selected characters, and the second count value is halted at a maximum value associated with the predetermined number.

10. The content search system of claim 9, wherein when the second count value equals the first count value, the corresponding state entry is terminated from the state list.

11. The content search system of claim 1, wherein the hardware-implemented processor creates, in the state list, a first state entry identifying a first instruction associated with the activator sub-expression prior to processing the current input character.

12. The content search system of claim 11, wherein the hardware-implemented processor creates, in the state list, a second state entry identifying a second instruction associated with the counter sub-expression in response to the current input character matching the activator sub-expression.

13. The content search system of claim 12, wherein the processor creates, in the state list, a third state entry identifying the second instruction associated with the counter sub-expression in response to a non-activator to activator character transition in the string of input characters.

14. A method performed by a hardware-implemented content search system for determining whether a string of input characters matches a regular expression that includes an activator sub-expression and a counter sub-expression, wherein the activator sub-expression comprises a prefix string and the counter sub-expression comprises a quantified character class, the method comprising:
   loading into a state list of the hardware-implemented content search system, a first state entry identifying, by an instruction address, a first instruction embodying the activator sub-expression;
   executing, by the hardware-implemented content search system, the first instruction to process a current input character; and
   if there is a match between the current input character and the activator sub-expression, loading, by the hardware-implemented content search system, into the state list a second state entry identifying a second instruction embodying the counter sub-expression, wherein the second state entry comprises:
   a first count value that indicates how many sequential input characters match the counter sub-expression; and
   a second count value that identifies a position of a first activator to non-activator character transition in the string of input characters.

15. The method of claim 14, wherein the position of the first activator to non-activator character transition indicates an earliest input character that cannot result in a match with the regular expression.

16. The method of claim 14, wherein the loading and executing are performed by a processor, of the hardware-implemented content search system, that implements a non-deterministic finite automaton (NFA) embodying the regular expression.

17. The method of claim 14, wherein the state list comprises:
   a current state list to store state entries that identify which of the instructions stored in an instruction memory, of the content search system, are to be executed to process the current input character; and a next state list to store state entries that identify which of the instructions stored in the instruction memory are to be executed to process a next input character.

18. The method of claim 17, wherein the current state list and the next state list are toggled, by the hardware-implemented content search system, prior to processing the next input character.

19. The method of claim 14, further comprising:
classifying, by the hardware-implemented content search system, each input character that matches both the activator sub-expression and the counter sub-expression as an activator character; and
classifying, by the hardware-implemented content search system, each input character that matches the counter sub-expression but not the activator sub-expression as a non-activator character.

20. The method of claim 14, further comprising:
incrementing, by the hardware-implemented content search system, the first count value in response to input character matches with the counter sub-expression; and
initially incrementing, by the hardware-implemented content search system, the second count value in response to the first activator to non-activator character transition.

21. The method of claim 20, further comprising:
incrementing, by the hardware-implemented content search system, the second count value in response to subsequent input character matches with the counter sub-expression.

22. The method of claim 20, wherein the quantified character class comprises a predetermined number of selected characters, and the method further comprises:
halting, by the hardware-implemented content search system, the second count value at a maximum value associated with the predetermined number.

23. The method of claim 22, further comprising:
when the second count value equals the first count value, terminating, by the hardware-implemented content search system, the corresponding state entry from the state list.

24. The method of claim 14, further comprising:
creating, by the hardware-implemented content search system, in the state list a third state entry identifying the second instruction associated with the counter sub-expression in response to a non-activator to activator character transition in the string of input characters.

* * * * *